(12) United States Patent
Inaba et al.

(10) Patent No.: US 11,279,281 B2
(45) Date of Patent: Mar. 22, 2022

(54) ABNORMALITY DETECTION APPARATUS, ABNORMALITY DETECTION METHOD, AND ABNORMALITY DETECTION SYSTEM

(71) Applicant: TOYOTA JIDOSHA KABUSHIKI KAISHA, Toyota (JP)

(72) Inventors: Chihiro Inaba, Yokohama (JP); Toshiki Endo, Shiki (JP); Eisuke Adachi, Kawasaki (JP); Takashige Hori, Aisai (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 340 days.

(21) Appl. No.: 16/107,157

(22) Filed: Aug. 21, 2018

(65) Prior Publication Data

US 2019/0061620 A1 Feb. 28, 2019

(30) Foreign Application Priority Data

Aug. 31, 2017 (JP) .............................. JP2017-167069

(51) Int. Cl.
*B60Q 11/00* (2006.01)
*G06K 9/00* (2022.01)
(Continued)

(52) U.S. Cl.
CPC ........ *B60Q 11/007* (2013.01); *G06K 9/00805* (2013.01); *G06K 9/00825* (2013.01); *G07C 5/008* (2013.01); *G07C 5/0808* (2013.01); *G08G 1/0112* (2013.01); *G08G 1/0129* (2013.01); *G08G 1/0175* (2013.01); *G08G 1/04* (2013.01); *G08G 1/096716* (2013.01);
(Continued)

(58) Field of Classification Search
CPC ............ B60Q 11/007; G06K 9/00805; G06K 9/00825; G06K 209/23; G07C 5/008; G07C 5/0808; G08G 1/0112; G08G 1/012; G08G 1/04; G08G 1/0967; G08G 1/096741; G08G 1/096775; G08G 1/096791

See application file for complete search history.

(56) References Cited

U.S. PATENT DOCUMENTS

2003/0167123 A1 9/2003 Nakazawa et al.
2009/0231429 A1* 9/2009 Hardee ............ G08G 1/096716
348/148
(Continued)

FOREIGN PATENT DOCUMENTS

JP H09-267686 A 10/1997
JP 2003-256998 A 9/2003
(Continued)

*Primary Examiner* — Khoi H Tran
*Assistant Examiner* — Nhi Q Bui
(74) *Attorney, Agent, or Firm* — Oliff PLC

(57) ABSTRACT

An abnormality detection apparatus, comprises a first acquisition unit configured to acquire imaged data obtained by imaging an object vehicle traveling on a road; a first recognition unit configured to recognize a lighting state of lighting devices of the object vehicle, based on the imaged data; a second recognition unit configured to recognize a lighting necessity of the lighting devices, based on the imaged data; and a detection unit configured to detect whether the lighting devices operate normally or abnormally, based on the lighting state and the lighting necessity.

12 Claims, 11 Drawing Sheets

(51) Int. Cl.
  *G07C 5/00* (2006.01)
  *G08G 1/0967* (2006.01)
  *G08G 1/017* (2006.01)
  *G08G 1/04* (2006.01)
  *G08G 1/01* (2006.01)
  *G07C 5/08* (2006.01)

(52) U.S. Cl.
  CPC . *G08G 1/096741* (2013.01); *G08G 1/096775* (2013.01); *G08G 1/096791* (2013.01); *G06K 2209/23* (2013.01)

(56) References Cited

U.S. PATENT DOCUMENTS

| | | | | |
|---|---|---|---|---|
| 2014/0032015 A1* | 1/2014 | Chun | ............... | G08G 1/166 701/2 |
| 2015/0158495 A1* | 6/2015 | Duncan | ............ | G08G 1/096716 701/1 |
| 2015/0343951 A1* | 12/2015 | Kim | ................... | B60G 17/0195 701/42 |
| 2016/0061625 A1* | 3/2016 | Wang | ..................... | G08G 1/012 701/454 |
| 2016/0379350 A1* | 12/2016 | Matsui | ................... | G06T 7/001 348/125 |
| 2016/0379423 A1* | 12/2016 | Nagata | ............... | B60R 16/0234 701/31.5 |
| 2017/0025006 A1* | 1/2017 | Puradchithasan | ............................ | G08G 1/096791 |

FOREIGN PATENT DOCUMENTS

| | | |
|---|---|---|
| JP | 2010-049442 A | 3/2010 |
| JP | 2010-137757 A | 6/2010 |
| JP | 2015-212133 A | 11/2015 |

* cited by examiner

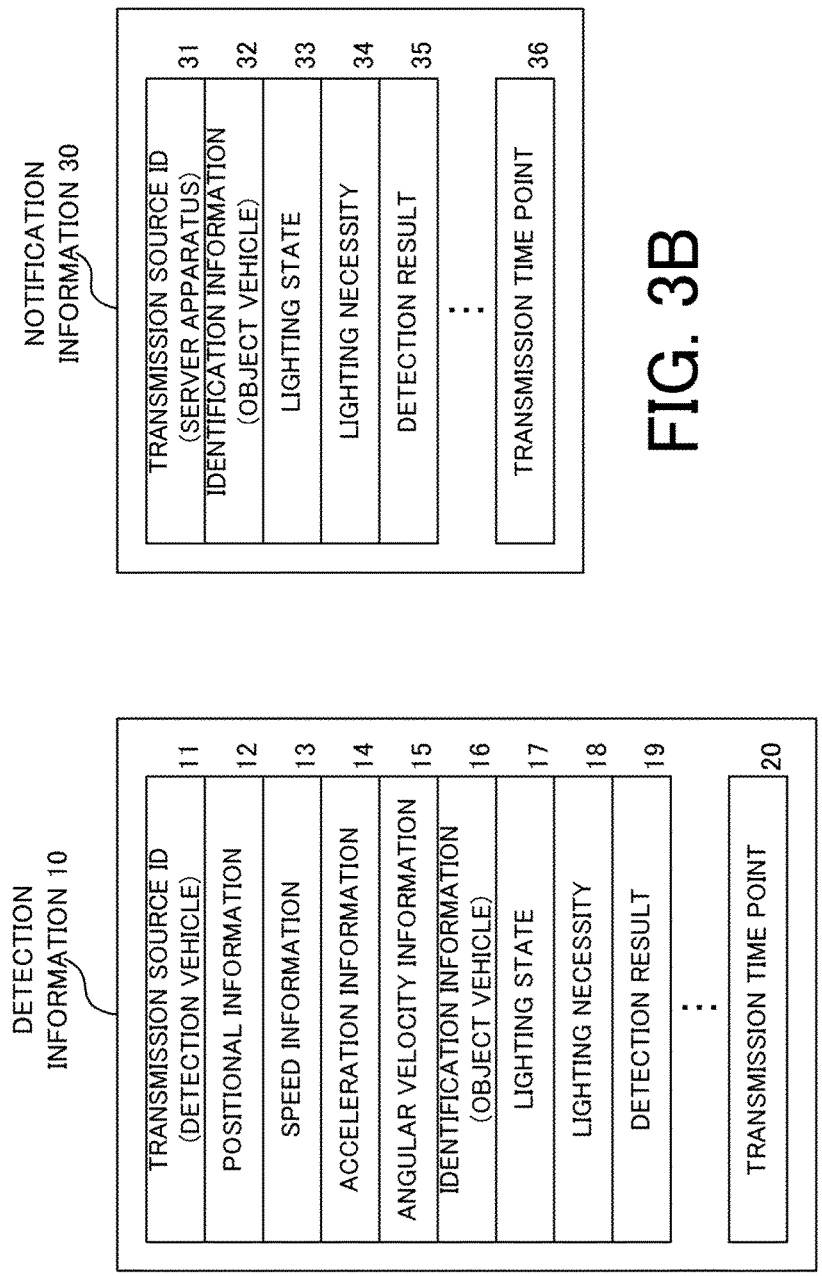

ABNORMALITY DETECTION APPARATUS, ABNORMALITY DETECTION METHOD, AND ABNORMALITY DETECTION SYSTEM

BACKGROUND OF THE INVENTION

Field of the Invention

The present invention relates to an abnormality detection apparatus, an abnormality detection method, and an abnormality detection system.

Description of the Related Art

Conventionally, detection of an abnormality in lighting and light signaling devices (hereinafter, "lighting devices") of a vehicle is performed by a vehicle per se performing a lighting operation. For example, in an invention described in Japanese Patent Application Laid-open No. 2010-137757, a vehicle performing a brake operation images its own stop lamp with a camera mounted in the vehicle and recognizes a lighting state of the stop lamp in accordance with a brake operation to perform abnormality detection. However, since a vehicle per se performs detection of its own abnormality, there is a problem that an abnormality cannot be appropriately detected when the abnormality occurs in circuitry per se.

Techniques for detecting an abnormality in lighting devices of another vehicle through connected services are recently being proposed. In an invention described in Japanese Patent Application Laid-open No. 2015-212133, a vehicle to perform detection (hereinafter, referred to as a detection vehicle) acquires brake operation information on a vehicle to be detected (hereinafter, referred to as an object vehicle) through vehicle-to-vehicle communication.

In addition, the detection vehicle performs abnormality detection by checking a lighting state of a stop lamp of the object vehicle with a camera in response to the acquisition of the operation information.

SUMMARY OF THE INVENTION

However, with the invention described in Japanese Patent Application Laid-open No. 2015-212133, the detection vehicle must acquire operation information on the object vehicle through vehicle-to-vehicle communication. Therefore, there is a problem in that, when the detection vehicle is unable to acquire operation information on the object vehicle, an abnormality of lighting devices of the object vehicle cannot be detected.

An object of the present invention is to provide a detection technique which enables an abnormality of lighting devices of an object vehicle to be detected without having to acquire information from another apparatus.

In order to achieve the object described above, in the present invention, an abnormality detection apparatus recognizes and compares lighting necessity and a lighting state of lighting devices of an object vehicle based on imaged data obtained by imaging the object vehicle to detect an abnormality of the lighting devices of the object vehicle.

Note that "the lighting devices" in the specification includes a lighting device (e.g. headlight) and a light signaling device (e.g. brake lamp, blinker, or the like).

The lighting necessity is recognized based on a behavior of the object vehicle obtained from imaged data. The lighting devices are any lighting mounted in a vehicle and examples thereof include a stop lamp (brake lamp), a head lamp (head light), a side indicator lamp (width indicator lamp), a fog lamp, a back-up lamp (reverse lamp), a tail lamp, and a hazard warning lamp. Examples of an abnormality of lighting devices include lighting not being lighted in a situation where the lighting needs to be lighted and lighting being lighted in a situation where the lighting need not be lighted. When the lighting devices described above include a plurality of lamps such as left and right lamps, a state where one or more lamps are not lighted may be considered a non-lighted state.

The present invention in its one aspect provides an abnormality detection apparatus, comprising a first acquisition unit configured to acquire imaged data obtained by imaging an object vehicle traveling on a road; a first recognition unit configured to recognize a lighting state of lighting devices of the object vehicle, based on the imaged data; a second recognition unit configured to recognize a lighting necessity of the lighting devices, based on the imaged data; and a detection unit configured to detect whether the lighting devices operate normally or abnormally, based on the lighting state and the lighting necessity.

A lighting state of lighting devices is recognized based on imaged data. A method of recognizing a lighting state based on imaged data is not particularly limited and any known technique can be used. The lighting necessity of lighting devices is recognized based on a behavior of the object vehicle obtained from imaged data. Recognition of the lighting necessity may be performed based on a current behavior or a predicted behavior of the object vehicle or performed based on a series of behaviors of the object vehicle upon completion of an operation that requires lighting. In addition, the detection unit is configured to perform an abnormality detection of the object vehicle by combining the lighting state and the lighting necessity.

According to such a configuration, the use of imaged data frees the abnormality detection apparatus from the need for information indicating that a control operation of the object vehicle has been performed and enables the abnormality detection apparatus to single-handedly detect an abnormality of the object vehicle.

The abnormality detection apparatus may further comprise a storage unit configured to store the lighting state, and the second recognition unit may retrospectively determine a period in which lighting is necessary, based on a behavior of the object vehicle obtained from the imaged data, and the detection unit may perform the detection, based on the period and the lighting state stored in the storage unit.

According to such a configuration, the abnormality detection apparatus can retrospectively recognize a lighting state of lighting devices based on information stored in the storage unit. Therefore, even when recognizing the lighting necessity during an operation that requires lighting, the abnormality detection apparatus can perform abnormality detection from a previous lighting state. Moreover, the storage unit need not be provided, in which case the abnormality detection apparatus may recognize the lighting necessity by performing behavior prediction of the object vehicle to determine a period in which lighting is required.

The abnormality detection apparatus may be an apparatus mounted in a vehicle that performs detection (hereinafter, a detecting vehicle), and the second recognition unit may recognize a relative movement of the object vehicle with respect to the detecting vehicle from the imaged data and may recognize a behavior of the object vehicle by combining the relative movement of the object vehicle with a movement of the detecting vehicle.

Further, the abnormality detection apparatus may be mounted in a road-side unit or may function as an application of a smartphone or the like.

Further, the lighting devices may be a blinker mounted in the object vehicle, and the second recognition unit may, when the object vehicle crosses a white line or turns left or right, determine the period, based on a timing at which the lighting devices should start operation and a timing at which the lighting devices should end operation.

A lane marker is not limited to a white line and may be a yellow line, a dotted line, and the like. An operation of "crossing the white line" may start when a part of the object vehicle rides on the white line and end when the object vehicle separates from the white line. Moreover, the second recognition unit may be configured to determine the period based on a behavior of the object vehicle involving moving to the left or right.

Further, the lighting devices may be a stop lamp mounted in the object vehicle, and the second recognition unit may, when the object vehicle stops or decelerates by a prescribed value or more, determine the period, based on a timing at which lighting of the lighting devices should be started and a timing at which lighting of the lighting devices should be ended.

Favorably, the abnormality detection apparatus may further include an acquisition unit configured to acquire identification information on the object vehicle. In addition, the identification information may be, but not limited to, license number information on the object vehicle. For example, the identification information may be a model or a color of the object vehicle or a vehicle-unique ID.

According to such a configuration, the abnormality detection apparatus can identify an object vehicle in which an abnormality is detected and, when outputting the detection of the abnormality to the outside, add information that identifies the object vehicle to the output abnormality.

Further, the abnormality detection apparatus may further comprise a transmission unit configured to transmit, when the detection unit detects an abnormality, detection information including a detection result and the identification information to a server apparatus.

Moreover, when the detection unit does not detect an abnormality, the transmitting unit may transmit the detection information.

According to such a configuration, the abnormality detection apparatus can transmit a detection result and the like to the server apparatus via a network. In addition, the server apparatus can specify the object vehicle based on the identification information.

Further, the abnormality detection apparatus may further comprise a notification unit configured to transmit, when the detection unit detects an abnormality, an abnormality notification notifying the object vehicle of an abnormality that has occurred in lighting devices.

As a method of notification, for example, vehicle-to-vehicle communication may be used or a notification may be issued using lighting of a lamp, sound from a horn or a speaker, or the like.

According to such a configuration, the abnormality detection apparatus can directly notify the object vehicle of an abnormality even when the network between the abnormality detection apparatus and the server apparatus is out of service. Moreover, the abnormality detection apparatus may determine whether the abnormality is to be transmitted to the server or the object vehicle is to be notified of the abnormality depending on an importance of the abnormality.

The present invention in its another aspect provides an abnormality detection system, comprising a plurality of detection vehicles mounted with the abnormality detection apparatus; and a server apparatus including a reception unit configured to receive the detection information from the detection vehicles and a notification unit configured to transmit an abnormality notification notifying a vehicle of an abnormality that has occurred in lighting devices.

The vehicle is one or more vehicles including the detection vehicle or the object vehicle.

According to such a configuration, the server apparatus can notify the object vehicle that an abnormality has occurred based on information received from a plurality of detection vehicles.

Further, the server apparatus may notify the object vehicle of the abnormality notification when the detection information is received a prescribed number of times or more.

The prescribed number of times is favorably the number of times in a prescribed period of time with respect to a specific vehicle.

According to such a configuration, by notifying the object vehicle only after a certain amount of abnormality information has been gathered, the server apparatus can prevent an erroneous detection result (detection information) from being notified to the object vehicle. Moreover, whether or not a detection result is to be notified may be determined in accordance with an importance of the detection result.

Further, the abnormality detection apparatus may add traffic information to the detection information and transmit the detection information to the server apparatus; and the server apparatus may obtain a lighting probability that is a probability at which a lighting operation is to be performed in a situation obtained from the traffic information, and notify the object vehicle of the abnormality notification when an abnormality of lighting devices of the object vehicle is consecutively detected for the number of times corresponding to the lighting probability.

For example, traffic information is information including a type of road, the number or shapes of lanes, crossing by pedestrians, a presence or absence of an oncoming vehicle or a preceding vehicle, an amount of traffic (density), a change in color of a traffic light, the weather, a time slot, or the like. The traffic information is acquired by a detection vehicle, the server apparatus, or the like. The lighting probability can be considered a probability at which a lighting operation is to be performed by an average driver in a specific situation. Moreover, when the driver can be specified, a probability at which the specific driver performs a lighting operation in a specific situation may be considered the lighting probability.

According to such a configuration, the server apparatus can assign a weight to a detection result in accordance with a specific situation. For example, in a situation where a frequency at which an average driver performs a lighting operation is low (a lighting probability is low), the number of times detection information needs to be received until a notification is issued to the object vehicle may be set larger. Moreover, when a detection vehicle transmits detection information even though the detection information represents a normal state, the number of times abnormality information (detection results) is consecutively received by the server apparatus can be used as the number of times detection information needs to be received as described above. Alternatively, a detection vehicle (an abnormality detection apparatus) may obtain the lighting probability described above and may transmit the lighting probability to the server when an abnormality is detected a prescribed number of times in accordance with the situation.

Further, the notification unit of the server apparatus may, in response to receiving the detection information indicating that the lighting devices of the object vehicle operate abnormally, transmit an investigation request for requesting an investigation of the object vehicle to detection vehicles in a periphery of the object vehicle, and the detection vehicles in the periphery may, when receiving the investigation request, transmit the detection information related to a vehicle corresponding to the identification information to the server apparatus, regardless of content of a detection result by the abnormality detection apparatus.

The server apparatus may transmit an investigation request to detection vehicles in a periphery when the detection information is received once or may transmit the investigation request when the detection information is received a prescribed number of times. Examples of detection vehicles in the periphery include a vehicle of which a distance to the object vehicle is equal to or smaller than a prescribed value and a vehicle positioned in a same area as the object vehicle. In this case, positional information on each vehicle can be retained in the server apparatus.

According to such a configuration, when identification information on an object vehicle in which an abnormality has possibly occurred is received from the server apparatus, the abnormality detection apparatus (a detection vehicle in a periphery) can transmit information with respect to the object vehicle regardless of whether or not an abnormality has occurred. Accordingly, when the driver does not light lighting devices of the object vehicle despite the lighting devices being normal, the server apparatus can be prevented from erroneously issuing an abnormality notification. Moreover, identification information on the object vehicle can be included in an investigation request.

Moreover, the present invention can also be considered an abnormality detection system including at least a part of the units described above. In addition, the present invention can also be considered an abnormality detection method which executes at least a part of the processes described above. Furthermore, the present invention can also be considered a computer program that causes the method to be executed by a computer or a computer-readable storage unit that non-transitorily stores the computer program. The respective units and processes described above can be combined with one another in any way possible to constitute the present invention.

The present invention in its another aspect provides an abnormality detection method comprising acquiring imaged data obtained by imaging an object vehicle traveling on a road; recognizing a lighting necessity of the lighting devices, based on the imaged data recognizing a lighting state of the lighting devices of the object vehicle, based on the imaged data; and detecting whether the lighting devices operate normally or abnormally, based on the lighting state and the lighting necessity.

The present invention in its another aspect provides a non-transitory computer readable storing medium recording a computer program for causing a computer to perform the above-described method.

According to the present invention, an abnormality of lighting devices of an object vehicle can be detected without having to acquire information from another apparatus.

BRIEF DESCRIPTION OF THE DRAWINGS

FIG. 3A is a diagram showing a message format of detection information, and FIG. 3B is a diagram showing a message format of notification information;

DESCRIPTION OF THE EMBODIMENTS

First Embodiment

A first embodiment of the present invention will be described below.

<Configuration>

Figure 1:
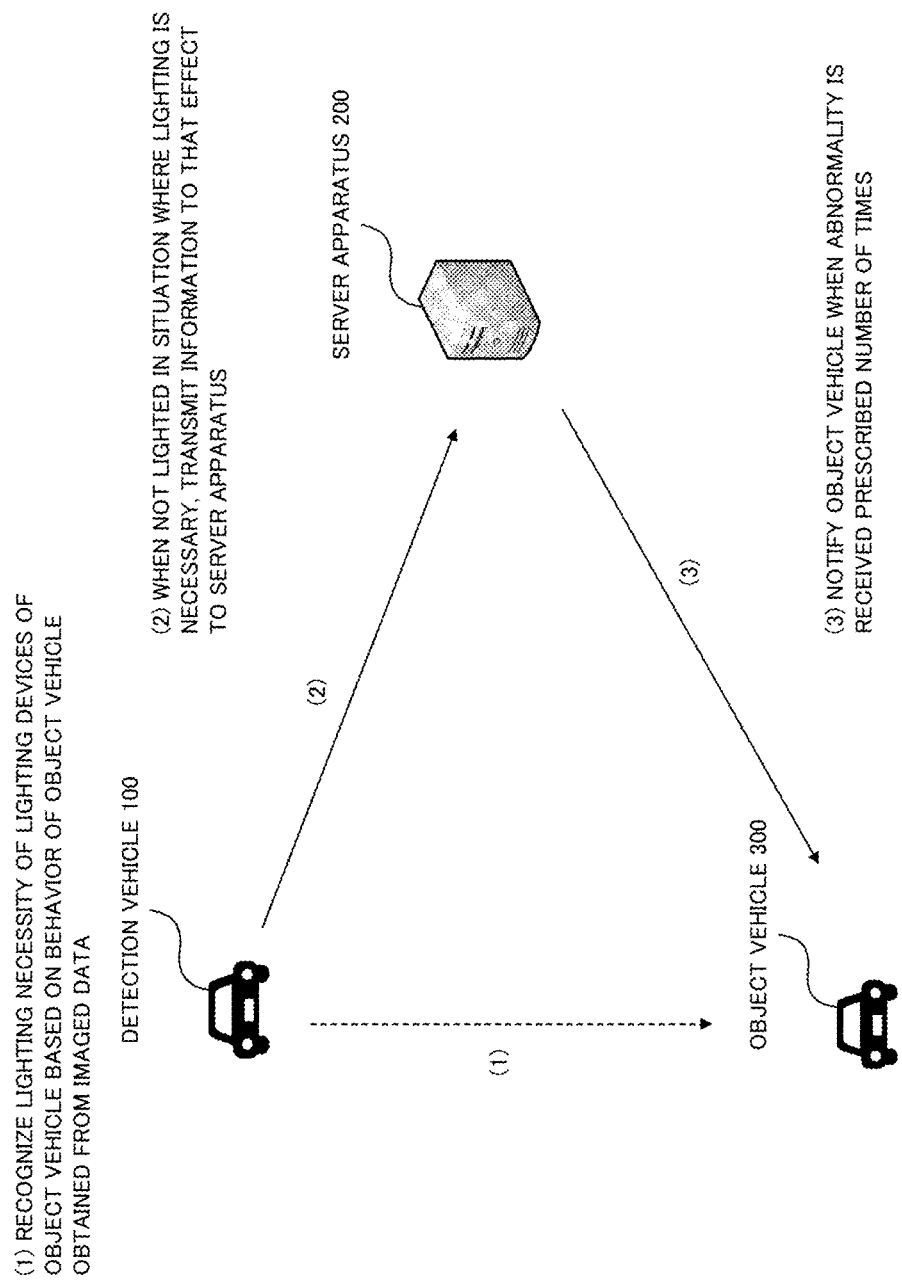
FIG. 1 is a diagram showing an outline of a system according to a first embodiment.

The present embodiment is an abnormality detection system in which a detection vehicle detects an abnormality in lighting devices of an object vehicle. As shown in FIG. 1, the present abnormality detection system is constituted by a detection vehicle 100, a server apparatus 200, and an object vehicle 300 which are capable of communicating with one another via a network.

In the present embodiment, the detection vehicle 100 is mounted with an abnormality detection apparatus 101. The abnormality detection apparatus 101 performs abnormality detection of lighting devices mounted in the object vehicle 300 based on imaged data obtained by imaging a periphery of the detection vehicle 100. The abnormality detection apparatus 101 transmits detection information including at least one of a detection result and identification information on the object vehicle 300 to the server apparatus 200 in accordance with the detection of an abnormality. The server apparatus 200 performs a notification to the object vehicle 300 in response to receiving the detection information.

Abnormality Detection Apparatus

Figure 2A:
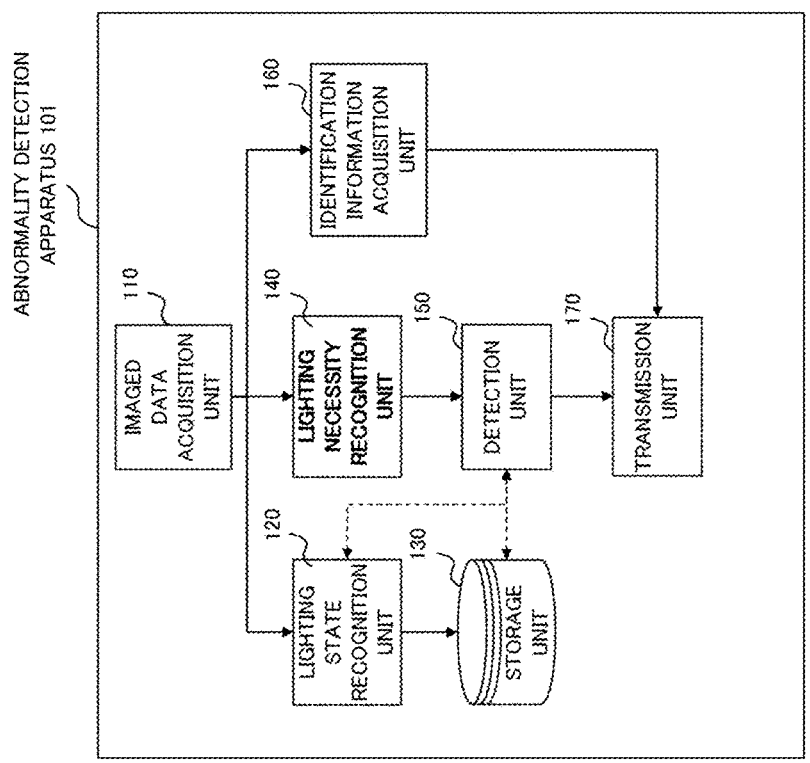
FIG. 2A is a functional block diagram of an abnormality detection apparatus according to the first embodiment.

FIG. 2A is a block diagram showing a configuration of the abnormality detection apparatus 101. The abnormality detection apparatus 101 is an information processing apparatus (computer) including a processing unit, a storage apparatus, an input/output apparatus, and the like. As the abnormality detection apparatus executes a program stored in the storage apparatus, functions of the abnormality detection apparatus 101 including an imaged data acquisition unit 110, a lighting state recognition unit 120, a storage unit 130, a lighting necessity recognition unit 140, a detection unit 150, an identification information acquisition unit 160, and a transmission unit 170 are provided. A part of or all of these functions may be implemented by a dedicated logic circuit such as an ASIC or an FPGA. Moreover, while an example in which the abnormality detection apparatus 101 is mounted in the detection vehicle 100 will be described in the present embodiment, the abnormality detection apparatus 101 is not limited thereto. For example, the functions described above may be provided using an information processing apparatus installed on a road, a smartphone, or the like as the abnormality detection apparatus 101.

The imaged data acquisition unit 110 (first acquisition unit) is a functional unit which acquires imaged data obtained by imaging the front of the detection vehicle 100. For example, the imaged data may be obtained by providing the imaged data acquisition unit 110 with a camera or may be captured using a camera, a smartphone, or the like separately provided in the detection vehicle 100. Alternatively, the imaged data acquisition unit 110 may acquire imaged data through a wireless or wired connection. In the present embodiment, the abnormality detection apparatus 101 performs abnormality detection of lighting devices with respect to a vehicle which is traveling on a road captured in imaged data as the object vehicle 300. The imaged data acquisition unit 110 outputs acquired imaged data to the lighting state recognition unit 120, the lighting necessity recognition unit 140, the identification information acquisition unit 160, and the like to be described later.

Moreover, the imaged data may be data capturing a portion other than the front (the rear, the left or right, or the like) of the detection vehicle 100. In addition, a position of the object vehicle 300 to be imaged is also not particularly limited. For example, the imaged data may be data capturing a vehicle positioned to the rear or to the side of the detection vehicle. Furthermore, the object vehicle 300 may be a specific vehicle or a plurality of vehicles. Moreover, while an example in which a captured image is a still image will be described, the captured image may be a moving image or the like.

The lighting state recognition unit 120 (first recognition unit) is a functional unit which recognizes a lighting state of the lighting devices of the object vehicle 300 based on imaged data. Although an example in which the lighting state recognition unit 120 recognizes a lighted state (including currently being lighted) or a non-lighted state of lighting devices will be described in the present embodiment, the lighting state recognized by the lighting state recognition unit 120 is not limited thereto. For example, the lighting state recognition unit 120 may recognize brightness in a lighted state of the lighting devices, a blinking speed (in a case of a blinker), a color, or the like. In addition, although an example in which the lighting state recognition unit 120 recognizes a lighting state of a blinker installed to the rear of a vehicle as the lighting devices will be described in the present embodiment, the lighting devices that are recognition objects are not limited thereto. For example, the lighting state recognition unit 120 may recognize any one of or a plurality of blinkers installed to the front, the side, or the rear of the vehicle or installed on a side mirror or the like. Alternatively, the lighting state recognition unit 120 may recognize a stop lamp (brake lamp), a head lamp (head light), a side indicator lamp (width indicator lamp), a fog lamp, a back-up lamp (reverse lamp), a tail lamp, a hazard warning lamp, or the like. Moreover, when two or more lamps or a same type are provided (for example, to the left and right), a state where only one lamp is not lighted may be considered a non-lighted state.

The storage unit 130 is a functional unit which stores a lighting state recognized by the lighting state recognition unit 120 described above. However, an object of storage by the storage unit 130 is not limited to a lighting state. For example, an object of storage by the storage unit 130 may be imaged data, identification information acquired by the identification information acquisition unit 160 to be described later, or the like. Moreover, the abnormality detection apparatus 101 need not include the storage unit 130.

The lighting necessity recognition unit 140 (second recognition unit) is a functional unit which recognizes a behavior of the object vehicle 300 from imaged data to recognize a lighting necessity of the lighting devices mounted in the object vehicle 300. In addition, when the lighting necessity recognition unit 140 recognizes that lighting is necessary, the lighting necessity recognition unit 140 obtains a period in which the lighting devices need to be lighted (necessary lighting period) based on start and end timings of the behavior of the object vehicle 300. Details of the lighting necessity recognition unit 140 will be provided in a description of processes given with reference to the flow charts shown in FIGS. 4 and 5. Moreover, the lighting necessity recognition unit 140 can retrospectively obtain a necessary lighting period by referring to the storage unit 130.

The detection unit 150 is a functional unit which detects an abnormality of the lighting devices based on the lighting necessity and the lighting state described above. While the detection unit 150 determines that the lighting devices are abnormal when the lighting devices are not lighted in a situation (during a period) where the lighting devices need to be lighted in the present embodiment, for example, the detection unit 150 may determine that the lighting devices are abnormal when the lighting devices are lighted in a situation where it is recognized that the lighting devices need not be lighted. In addition, the detection unit 150 uses at least any one of a current lighting state as recognized by the lighting state recognition unit 120 and a previous lighting state retained by the storage unit 130. Moreover, details of the detection unit 150 will be provided in a description of processes given with reference to the flow chart shown in FIG. 4.

The identification information acquisition unit 160 (second acquisition unit) is a functional unit which acquires identification information on the object vehicle 300 using imaged data. In the present embodiment, the identification information acquisition unit 160 acquires license number information from a license plate or the like. The identification information is not limited to license number information. For example, the identification information acquisition unit 160 may use information including a model or color, a shape, positional information, or the like of the object vehicle 300 as identification information. Furthermore, the identification information acquisition unit 160 need not use imaged data and may acquire a vehicle-unique ID via communication and use the ID as identification information. In addition, the identification information acquisition unit 160 may combine these pieces of information and use the combined pieces of information as identification information. Moreover, the abnormality detection apparatus 101 need not include the identification information acquisition unit 160.

The transmission unit 170 is a functional unit which transmits information via wireless communication or the like to the server apparatus 200 in accordance with the detection of an abnormality. The information transmitted by the transmission unit 170 includes detection information.

Examples of detection information include information related to a vehicle that is a transmission source such as a position, speed, or the like of the vehicle and information related to an object vehicle such as identification information or a detection result. In the present embodiment, the transmission unit 170 transmits detection information 10 in a format shown in FIG. 3A. In the present embodiment, the detection information includes at least identification information and a detection result. Moreover, the transmission unit 170 may transmit a detection result and the like every time an abnormality is detected or transmit a detection result and the like when an abnormality is detected a prescribed number of times.

The detection information 10 includes a transmission source ID 11, positional information 12, speed information 13, acceleration information 14, and angular velocity information 15 as information on the detection vehicle 100, and identification information 16, a lighting state 17, lighting necessity 18, a detection result 19, a transmission time point 20, and the like as information on the object vehicle 300. The transmission source ID is an identifier for specifying the detection vehicle 100. The positional information 12 is, for example, information acquired from a positional information sensor such as a GPS apparatus and may be expressed in a latitude-longitude-altitude format or a map code format. The speed information 13, the acceleration information 14, and the angular velocity information 15 are acquired using one or more sensors provided in the detection vehicle 100. The identification information 16 is information acquired by the identification information acquisition unit 160 described above and is an identifier for specifying the object vehicle 300. In a similar manner, the lighting state 17, the lighting necessity 18, and the detection result 19 are information respectively output by the lighting state recognition unit 120, the lighting necessity recognition unit 140, and the detection unit 150 described above. The transmission time point 20 is a time point at which the detection information is generated.

Server Apparatus

Figure 2B:
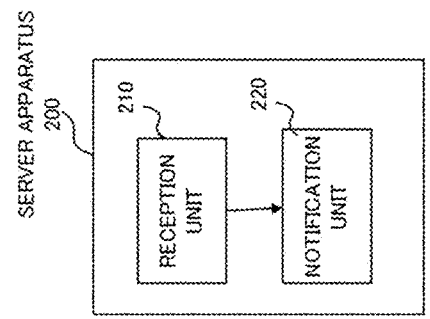
FIG. 2B is a functional block diagram of a server apparatus according to the first embodiment.

FIG. 2B is a block diagram showing a configuration of the server apparatus 200. The server apparatus 200 is an information processing apparatus (computer) including a processing unit, a storage apparatus, an input/output apparatus, and the like. Functions such as a reception unit 210, a notification unit 220, and the like are provided as the server apparatus executes a program stored in the storage apparatus. A part of or all of these functions may be implemented by a dedicated logic circuit such as an ASIC or an FPGA.

The reception unit 210 is a functional unit which receives detection information transmitted from the abnormality detection apparatus 101.

The notification unit 220 is a functional unit which transmits an abnormality notification notifying the object vehicle 300 or the like of the presence of an abnormality in the lighting devices in response to the reception of detection information. In the present embodiment, the notification unit 220 issues notification information 30 in a format shown in FIG. 3B. In the present embodiment, the notification information includes at least identification information and a detection result.

The notification information 30 includes a transmission source ID 31 as information on the server apparatus 200, and identification information 32, a lighting state 33, a lighting necessity 34, a detection result 35, a transmission time point 36, and the like as information on the object vehicle 300. The transmission source ID 31 is an identifier for specifying the server apparatus 200. The identification information 32, the lighting state 33, the lighting necessity 34, and the detection result 35 are information obtained from the identification information 16, the lighting state 17, the lighting necessity 18, and the detection result 19 included in the detection information 10 described above. The transmission time point 36 is a time point at which the notification information is generated. In the present embodiment, the notification information 30 includes at least the identification information 32 and the detection result 35.

<Processes>

Figure 4:
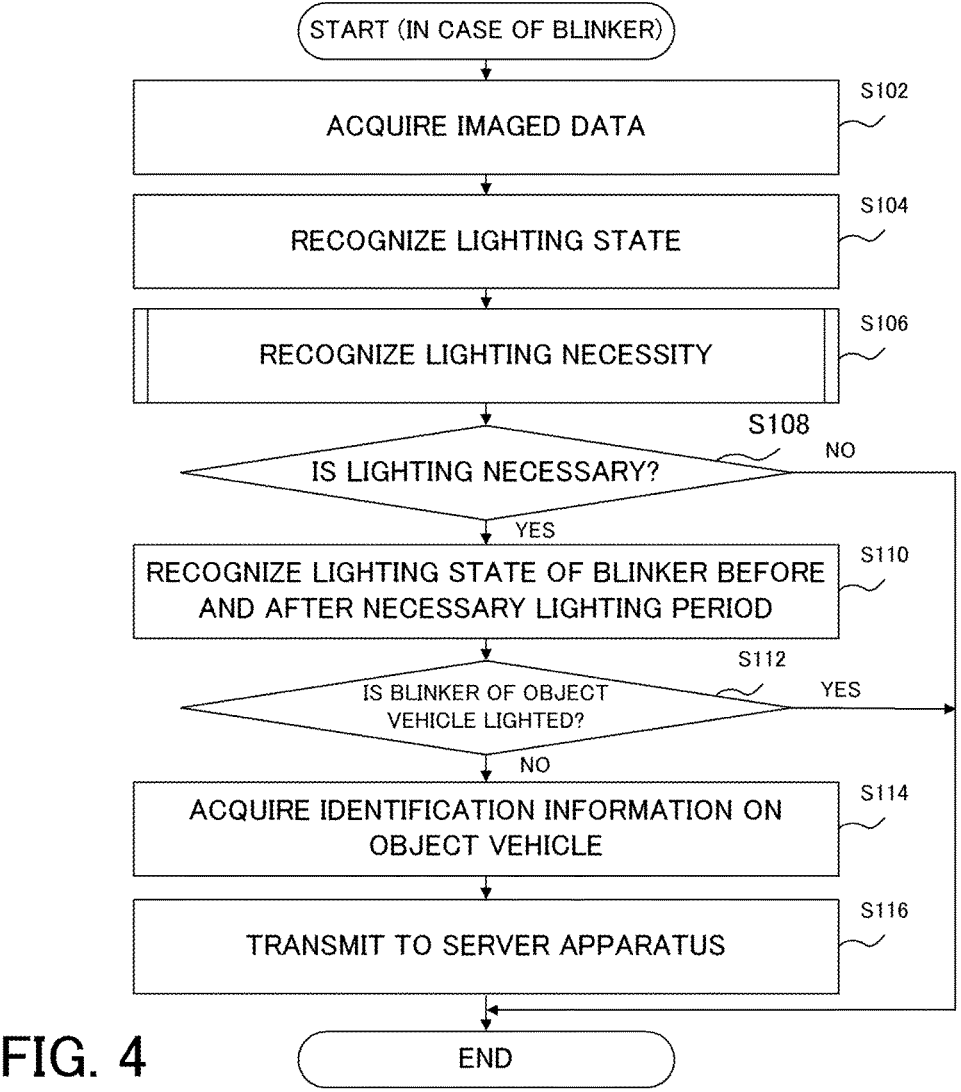
FIG. 4 is a flow chart showing processes of the abnormality detection apparatus according to the first embodiment.

Operation of Abnormality Detection Apparatus Processes performed by the abnormality detection apparatus 101 will be described with reference to FIG. 4. Moreover, while the flow chart shows the respective processes as though being sequentially performed, the processes need not necessarily be performed in this order and may be executed in a different order or may be executed in parallel with a plurality of processes.

The imaged data acquisition unit 110 acquires imaged data obtained by imaging the periphery of the detection vehicle 100 (S102). The imaged data acquisition unit 110 outputs the imaged data acquired by imaging to the lighting state recognition unit 120, the lighting necessity recognition unit 140, the identification information acquisition unit 160, and the like. In addition, with respect to the object vehicle 300 captured in the imaged data, the lighting state recognition unit 120 recognizes a lighting state of lighting devices using the imaged data (S104). In this case, existing techniques can be used to recognize the lighting state of lighting devices using imaged data. For example, a lighting region of a lamp can be detected and a lighting state can be recognized based on lightness in the region (Japanese Patent Application Laid-open No. H09-267686). Subsequently, the lighting state recognition unit 120 outputs the lighting state to the storage unit 130. The storage unit 130 stores the lighting state of the object vehicle 300.

The lighting necessity recognition unit 140 recognizes a lighting necessity of lighting devices of the object vehicle 300 using the imaged data (S106). Specifically, the lighting necessity recognition unit 140 recognizes a behavior of the object vehicle 300 and recognizes that lighting is necessary when, for example, a lane change is recognized. In addition, when it is recognized that lighting is necessary, a necessary lighting period is obtained based on start (start of operation) and end timings of the behavior. Details of the lighting necessity recognition process S106 will be provided later in a description of processes given with reference to the flow chart shown in FIG. 5.

The abnormality detection apparatus 101 determines whether or not lighting of the lighting devices of the object vehicle 300 is necessary (S108). When it is determined that lighting is necessary (S108—YES), the detection unit 150 recognizes a lighting state of the blinker in the necessary lighting period (S110). At this point, the detection unit 150 uses at least any one of the lighting state recognition unit 120 and the storage unit 130. In addition, when it is recognized that the blinker is not lighted in the necessary lighting period (S112—NO), the identification information acquisition unit 160 acquires identification information on the object vehicle 300 from imaged data (S114) and the transmission unit 170 transmits the detection information 10 to the server apparatus 200 (S116). In this case, as the lighting state in the necessary lighting period, a lighted state may be determined when the blinker is lighted during the entire period or a part of the period or a lighted state may be determined when the blinker is lighted for a prescribed percentage of more of the period.

Lighting Necessity Recognition Process

Figure 5:
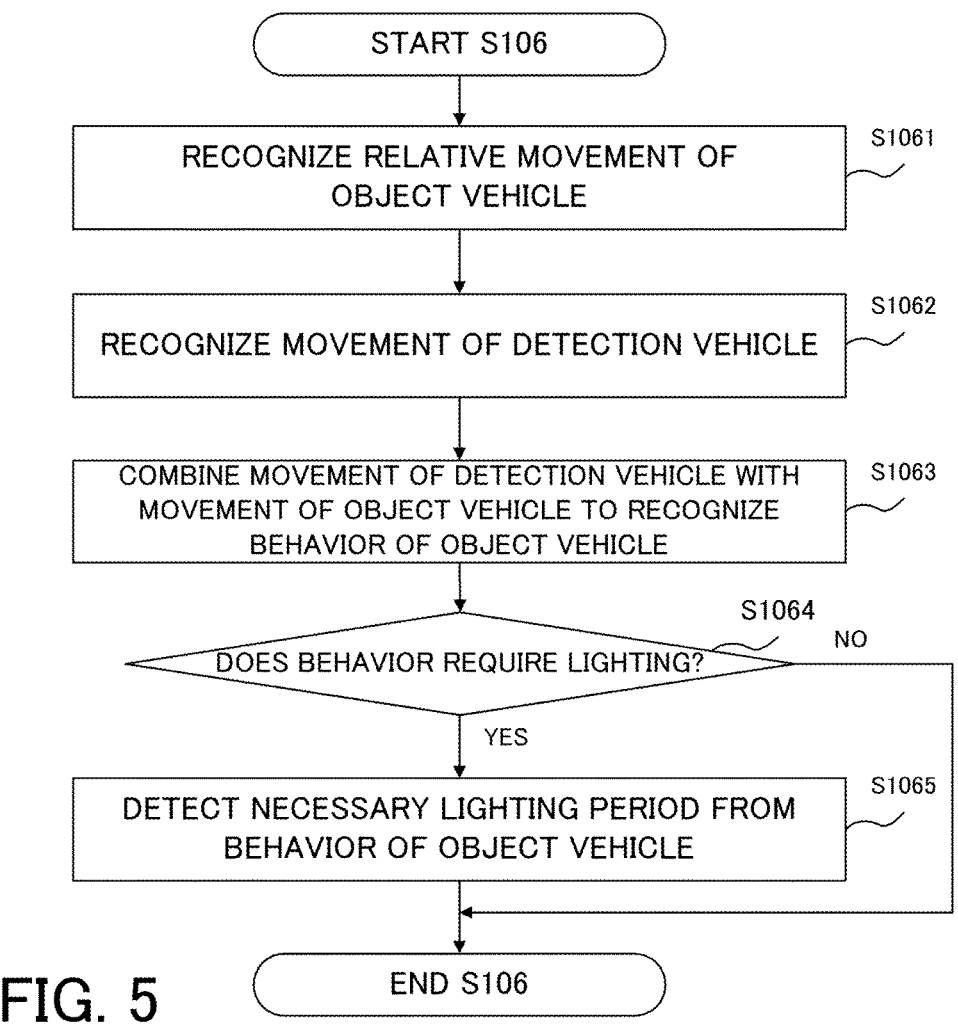
FIG. 5 is a flow chart showing a lighting necessity determination process in the abnormality detection apparatus according to the first embodiment.

Details of processing of the lighting necessity recognition process S106 will be described with reference to FIG. 5. First, based on a movement in an image of the object vehicle 300 in imaged data, the lighting necessity recognition unit 140 recognizes a relative movement of the object vehicle 300 with respect to the detection vehicle 100 (S1061). Examples of a relative movement include a forward, backward, leftward, or rightward positional change relative to a direction of travel of the object vehicle 300 with respect to the detection vehicle 100. Next, the lighting necessity recognition unit 140 recognizes a movement of the detection vehicle 100 using a sensor (not shown) provided in the detection vehicle 100 (S1062). In this case, the sensor recognizes a value of at least one or more items of a position, a speed, acceleration, and an angular velocity (yaw rate).

Figure 7:
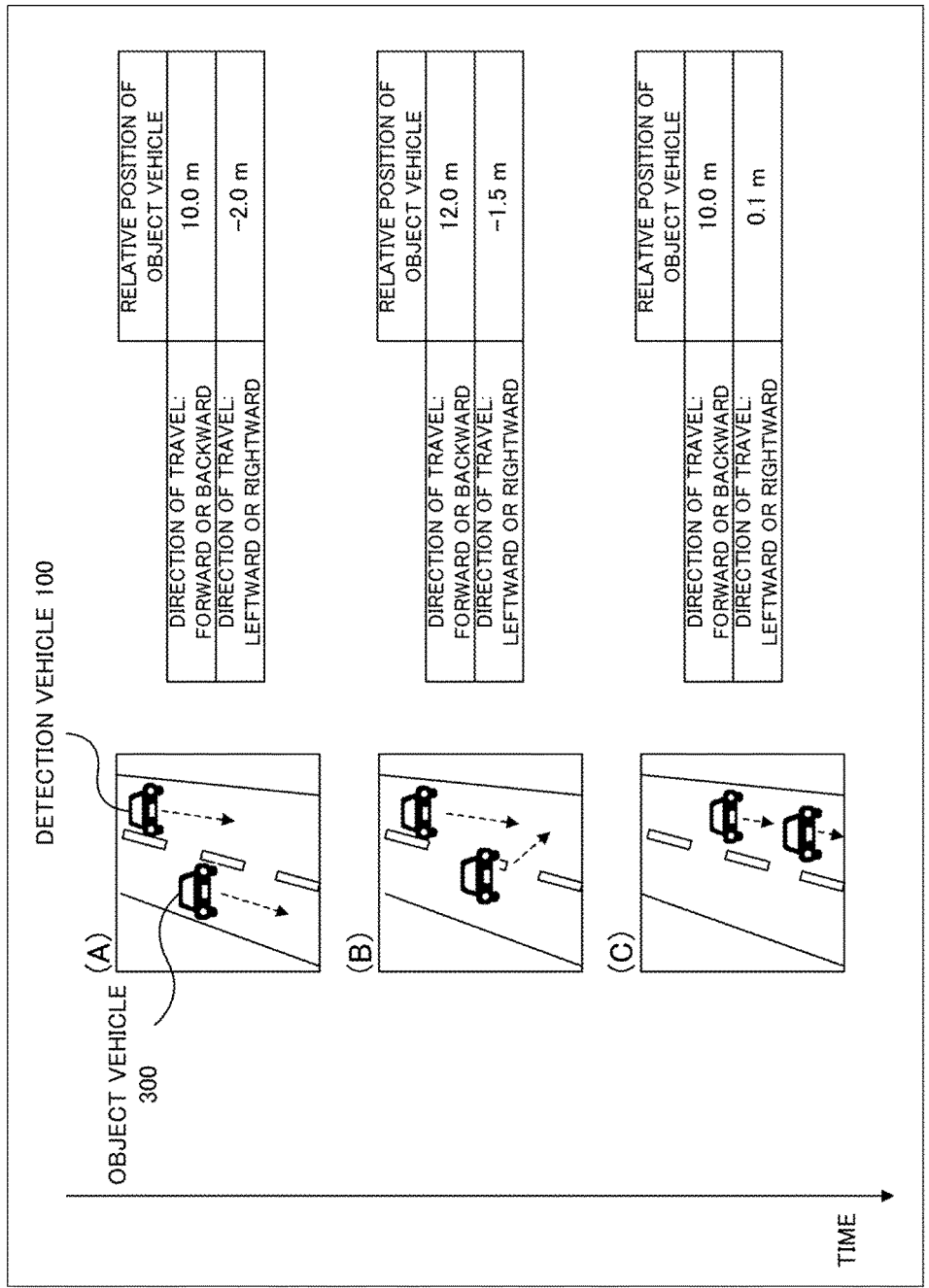
FIG. 7 is a diagram showing a behavior recognition process in the abnormality detection apparatus according to the first embodiment.

The lighting necessity recognition unit 140 combines the movement of the detection vehicle 100 with the movement of the object vehicle 300 to recognize a behavior of the object vehicle 300 (S1063). FIG. 7 shows an example of recognizing a lane change of the object vehicle 300 in the present embodiment. (A) in FIG. 7 represents an example in which the object vehicle 300 is positioned 10.0 m forward and 2.0 m rightward (−2.0) with respect to the direction of travel of the detection vehicle 100. (B) represents an example in which the object vehicle 300 has moved to the left and is now positioned 12.0 m forward and 1.5 m rightward (−1.5) with respect to the direction of travel of the detection vehicle 100. Furthermore, (C) represents an example in which the object vehicle 300 is positioned 10.0 m forward and 0.1 m leftward with respect to the direction of travel of the detection vehicle 100. When the detection vehicle 100 moves left or right with respect to the direction of travel, the behavior is recognized based on movements of the detection vehicle 100 and the object vehicle 300. Moreover, it is assumed that the detection vehicle 100 is moving in the direction of travel at a prescribed speed.

The lighting necessity recognition unit 140 determines whether or not lighting is necessary based on the behavior of the object vehicle 300 (S1064). When it is determined that the behavior requires lighting (S1064—YES), a period during which lighting of the lighting devices is necessary is obtained from the behavior of the object vehicle 300 (S1065). Specifically, the lighting necessity recognition unit 140 obtains the necessary lighting period using a start time point and an end time point of a lane change by the object vehicle 300. For example, while the necessary lighting period can be set from three seconds prior to the start time point to three seconds after the end time point of a lane change, a calculation method of the necessary lighting period is not particularly limited. The start timing of the necessary lighting period may occur before or after the start time point of a lane change and the end timing of the necessary lighting period may occur before or after the end time point of the lane change.

In the present embodiment, the lighting necessity recognition unit 140 considers start and end timings of an operation in which the object vehicle 300 crosses a white line (a lane marker) to be the start and end timings of a lane change. While a method of recognizing an operation involving crossing a white line from the behavior of the object vehicle 300 is not particularly limited, the following methods can be used. For example, the lighting necessity recognition unit 140 may provide a rule-based classifier to recognize the behavior of the object vehicle 300 (method 1). In addition, the lighting necessity recognition unit 140 may encode a behavior of the vehicle to create a feature amount and, based on the feature amount, recognize crossing of a white line or the like using a classifier generated by machine learning. In this case, bag of systems (BoS) or the like can be used as an encoding method and support vector machine (SVM) or the like can be used as a method of machine learning (method 2). Furthermore, crossing of a white line or the like may be recognized using a classifier directly generated by machine learning from a behavioral pattern of a vehicle (method 3). Moreover, the lighting necessity recognition unit 140 may recognize a white line or the like from imaged data and recognize crossing of the white line or the like by the object vehicle 300 (method 4). In addition, a method of recognizing a lane change is not limited to the crossing of a white line. For example, a lane change may be recognized using an amount of a leftward or rightward movement.

Moreover, a method of recognizing lighting necessity is not limited to a lane change. Applicable examples include a left or right turn at a large intersection or a narrow street crossing, a long gentle turn made while traveling straight in terms of road structure through a Y-junction, and starting a vehicle. In addition, the lighting necessity recognition unit 140 may recognize lighting necessity upon receiving information indicating that a turn signal has been operated.

Operation of Server Apparatus

Figure 6:
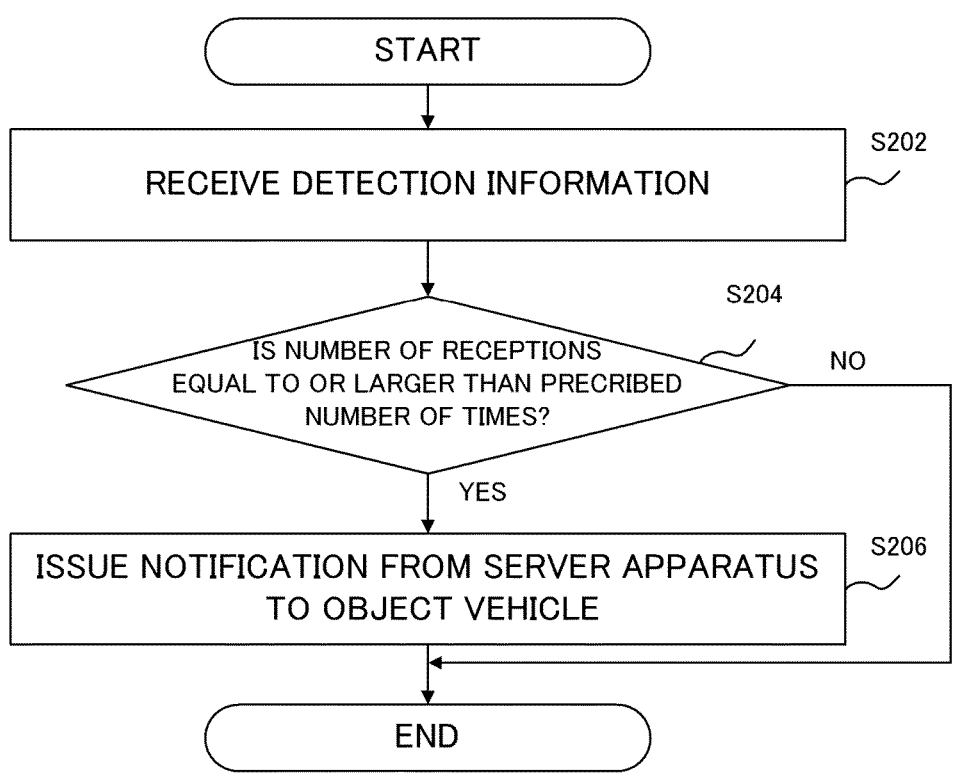
FIG. 6 is a flow chart showing processes of the server apparatus according to the first embodiment.

Processes performed by the server apparatus 200 will be described with reference to FIG. 6. Moreover, while the flow chart shows the respective processes as though being sequentially performed, the processes need not necessarily be performed in this order and may be executed in a different order or may be executed in parallel with a plurality of processes.

When the reception unit 210 receives detection information transmitted from the abnormality detection apparatus 101 (S202), the server apparatus 200 determines whether or not detection information has been received a prescribed number of times or more within a prescribed period of time with respect to a specific object vehicle 300 (S204). Conditions under which the server apparatus 200 notifies the object vehicle 300 of information are not particularly limited. For example, the notification unit 220 may determine whether or not to issue a notification based on a period, a frequency, an area, the importance described earlier, or a combination of these factors with respect to a notification by the abnormality detection apparatus 101. Moreover, the server apparatus 200 may always issue a notification to the object vehicle 300 when detection information is received from the abnormality detection apparatus 101.

When detection information is received a prescribed number of times or more (S204—YES), the notification unit 220 notifies the object vehicle 300 of notification information (abnormality notification) (S206). Moreover, the prescribed number of times described above may be changed for each object vehicle 300. In this case, the prescribed number of times may be provided to as to be changeable by a user using the object vehicle 300. In response to acquiring notification information, the object vehicle 300 performs a notification to a driver, confirmation of a failure, notification of a confirmation result, and the like.

Advantageous Effects of the Present Embodiment

According to the present embodiment, an abnormality detection apparatus can detect an abnormality of lighting devices in an object vehicle solely using a detecting vehicle by recognizing a lighting necessity based on recognition of a behavior of the object vehicle obtained from imaged data.

In addition, since a server apparatus can obtain detection information from a plurality of detecting vehicles, even when erroneous information (information reflecting an erroneous recognition of a lighting state or the like) is included in a part of the detection information, notification of erroneous information to the object vehicle can be avoided. Furthermore, by providing a storage unit, when the abnormality detection apparatus performs behavior recognition of the object vehicle, the abnormality detection apparatus need no longer perform complicated processes such as behavior prediction and a lighting necessity can be recognized after an operation requiring lighting is performed. In addition, since the abnormality detection apparatus transmits identification crossing an object vehicle and a detection result, the server apparatus can reliably specify the object vehicle.

Modification of First Embodiment

As a modification of the first embodiment, an example of detecting an abnormality of a stop lamp instead of a blinker of the object vehicle 300 will be described.

While an example of detecting an abnormality of a blinker based on a behavior of the object vehicle 300 has been described above, a detection object is not limited thereto. For example, an abnormality of the stop lamp of the object vehicle 300 can be detected by recognizing a lighting necessity of the stop lamp.

In this case, the lighting necessity recognition unit 140 recognizes the lighting necessity based on a change in acceleration of the object vehicle 300. Specifically, when the lighting necessity recognition unit 140 recognizes stopping or a deceleration of a prescribed value or more from imaged data, the lighting necessity recognition unit 140 may consider a period required to stop or decelerate as the necessary lighting period. In this manner, by providing a prescribed deceleration, the lighting necessity recognition unit 140 determines that deceleration not accompanied by lighting of the stop lamp such as engine braking does not require lighting.

Lighting devices to be detection objects of the abnormality detection apparatus 101 are not limited to the examples described above. For example, the abnormality detection apparatus 101 may detect an abnormality of a head lamp, a side indicator lamp, a fog lamp, a back-up lamp, a tail lamp, a hazard warning lamp, or the like of the object vehicle 300. In addition, the lighting necessity of a head lamp or the like may be recognized in consideration of time point information. Furthermore, the object vehicle 300 is not limited to a preceding vehicle and may be an oncoming vehicle, a subsequent vehicle, an adjacent vehicle, or the like. Moreover, the object vehicle is not limited to a four-wheel vehicle and may be a two-wheel vehicle or the like.

Second Embodiment

A second embodiment of the present invention will be described below.

While the server apparatus 200 determines whether or not to issue a notification to the object vehicle 300 based on the number of times detection information is received or the like in the first embodiment described above, in the present embodiment, the server apparatus 200 determines whether or not to issue a notification by also taking traffic information added to detection information into consideration. For example, traffic information is information including a type of road, the number or shapes of lanes, a presence or absence of pedestrians, a situation (a presence or absence) of other vehicles such as an oncoming vehicle or a preceding vehicle, an amount of traffic, the weather or a time slot, a presence or absence of congestion or road construction, a lane closure, road surface conditions, or the like. Moreover, the detecting vehicle 100 may recognize traffic information based on imaged data or may acquire traffic information from the outside.

The server apparatus 200 obtains a lighting probability that is a probability at which a lighting operation is to be performed in a situation obtained from received traffic information. The lighting probability can be calculated using a Bayesian network or the like. The lighting probability can be considered a probability at which a lighting operation is to be performed by an average driver in a specific situation. For example, the lighting probability is expected to increase in a situation in which a lane change is performed but the lighting probability is expected to decrease in a situation of through traffic at a Y-junction. In addition, when the driver can be specified, a probability at which the specific driver performs a lighting operation in a specific situation may be considered the lighting probability. For example, a determination of whether or not to perform a lighting operation when driving to avoid road construction is expected to differ from one driver to another. The server apparatus 200 issues an abnormality notification when an abnormality of lighting devices of the object vehicle 300 is consecutively confirmed for the number of times corresponding to the lighting probability described above within a prescribed period of time. For example, the server apparatus 200 may issue a notification only when the number of times lighting is not performed equals or exceeds a prescribed number of times when the lighting probability is equal to or higher than a prescribed value. Accordingly, a notification can be issued only when it is highly probable that lighting devices are abnormal. Moreover, the server apparatus 200 may acquire traffic information.

In addition, while an example in which detection information is transmitted to the server apparatus 200 when the abnormality detection apparatus 101 detects an abnormality has been described in the first embodiment, the abnormality detection apparatus 101 may transmit detection information to the server apparatus 200 when a detection result is normal. In this case, the server apparatus 200 may issue an abnormality notification when detection information indicating that the object vehicle 300 operates abnormally is consecutively received for the number of times corresponding to the lighting probability described above within the prescribed period of time. The number of times corresponding to the lighting probability is, for example, the number of times in which a sum of lighting probabilities exceeds a prescribed value (for example, 300%). Accordingly, when the driver does not light lighting devices of the object vehicle 300 despite the lighting devices being normal, the server apparatus 200 can be prevented from erroneously issuing an abnormality notification.

The function described above may be provided by the abnormality detection apparatus 101.

Figure 8:
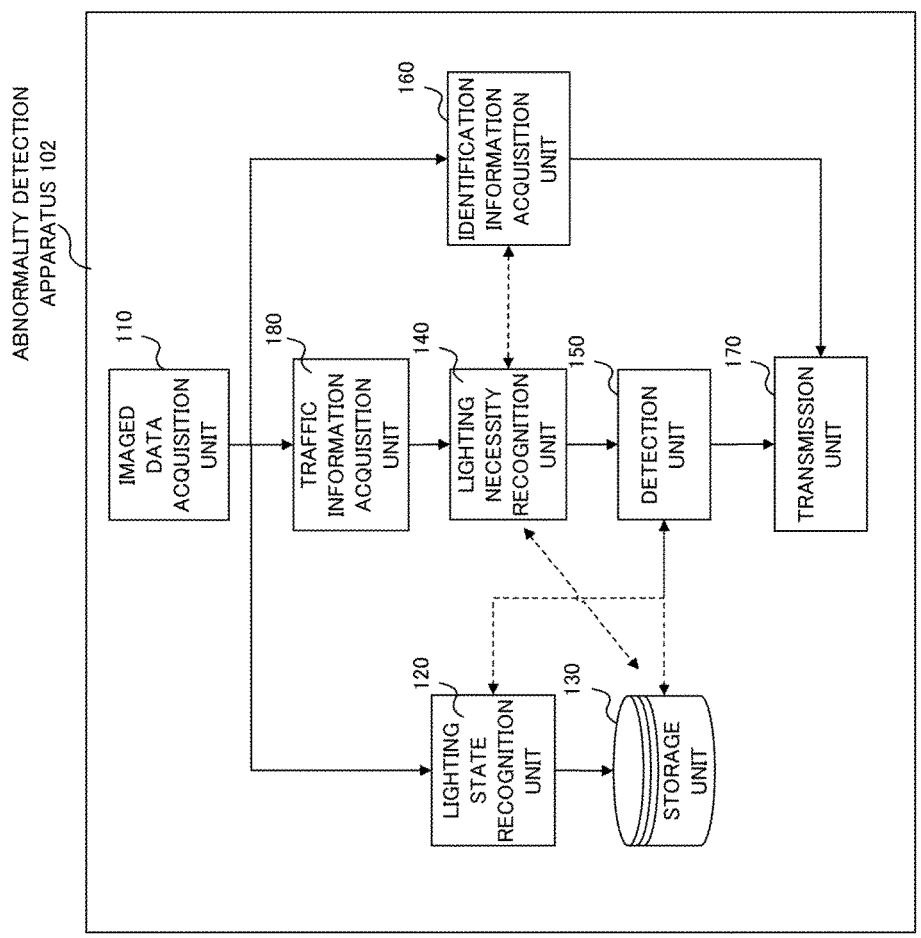
FIG. 8 is a functional block diagram showing an example of an abnormality detection apparatus according to a second embodiment.

FIG. 8 shows an abnormality detection apparatus 102 having a traffic information acquiring unit 180 in addition to the configuration of the abnormality detection apparatus 101 according to the first embodiment.

While the traffic information acquiring unit 180 acquires traffic information from imaged data in the present embodiment, traffic information may be acquired from an external apparatus. In addition, the lighting necessity recognition unit 140 obtains the lighting probability described above. Alternatively, a lighting probability may be retained by an external apparatus and the abnormality detection apparatus 102 may acquire the lighting probability from the external apparatus. Information such as the number of times described above may be stored in the storage unit 130. Furthermore, the lighting necessity recognition unit 140 may acquire identification information on the object vehicle 300 from the identification information acquisition unit 160. According to the configuration described above, since the detecting vehicle 100 transmits abnormality information to the server apparatus 200 in accordance with the lighting probability, excessive abnormality notifications to the server apparatus 200 can be suppressed.

Third Embodiment

A third embodiment of the present invention will be described below.

While an example in which the abnormality detection apparatus 101 notifies the server apparatus 200 when detecting an abnormality has been described in the embodiments presented above, in the present embodiment, an example will be described in which transmission is performed regardless of whether or not an abnormality is detected.

Figure 9:
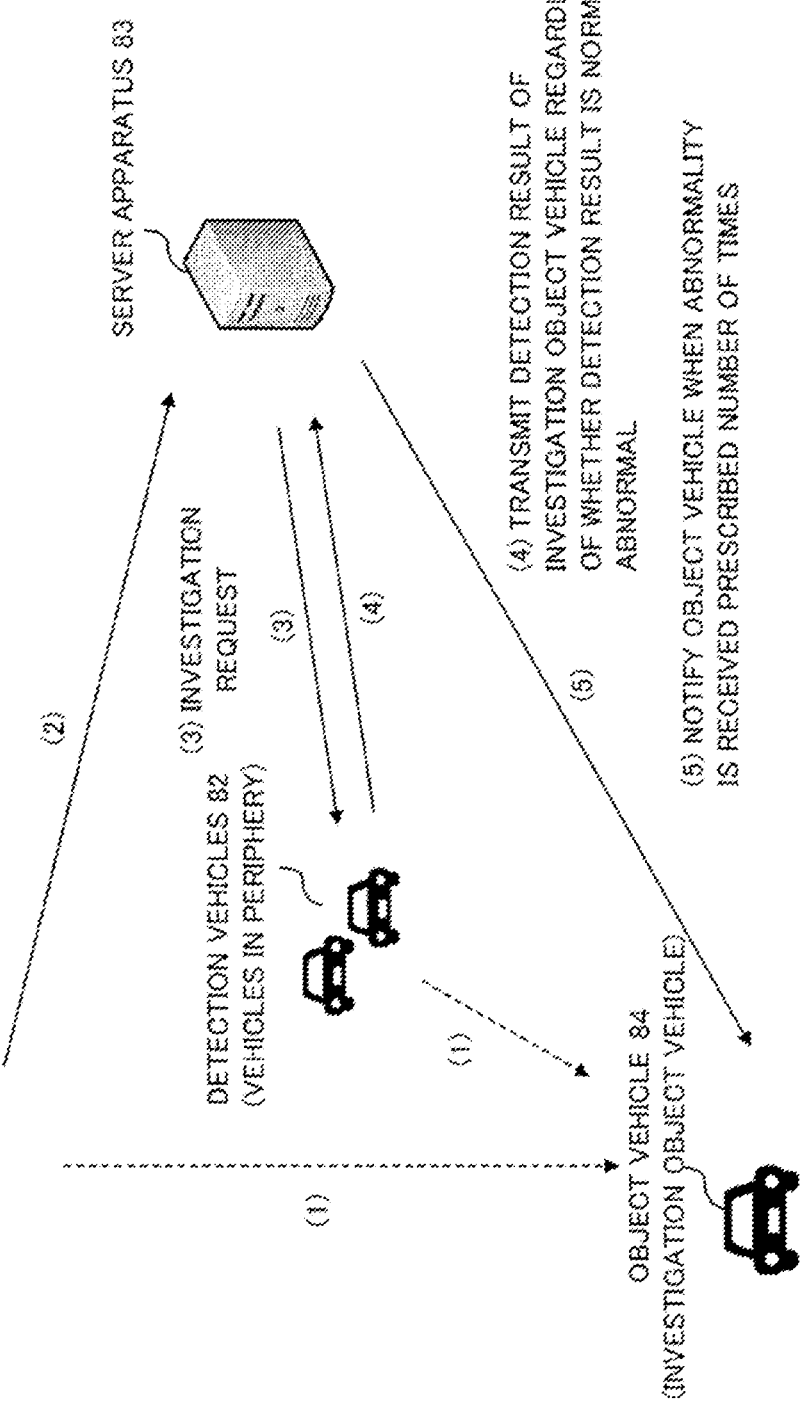
FIG. 9 is a diagram showing an outline of a system according to a third embodiment.

FIG. 9 is a schematic view of an abnormality detection system according to the present embodiment.

In the present embodiment, when a server apparatus 83 receives detection information representing an abnormality (hereinafter, referred to as abnormality detection information) a prescribed number of times (including once) or more, the server apparatus 83 recognizes a corresponding object vehicle 84 as an investigation object vehicle. In addition, the server apparatus 83 transmits an investigation request for requesting an investigation of the investigation object vehicle to a plurality of detecting vehicles 82 (abnormality detection apparatuses 101) positioned in a periphery of the investigation object vehicle. When receiving an investigation request, the plurality of detecting vehicles 82 in the periphery perform transmission to the server apparatus 83 regardless of contents of detection results. When the server apparatus 83 receives abnormality detection information a prescribed number of time or more with respect to the investigation object vehicle, the server apparatus 83 notifies the corresponding object vehicle 84 (investigation object vehicle) of an abnormality.

<Processes>

Operation of Abnormality Detection Apparatus

Figure 10:
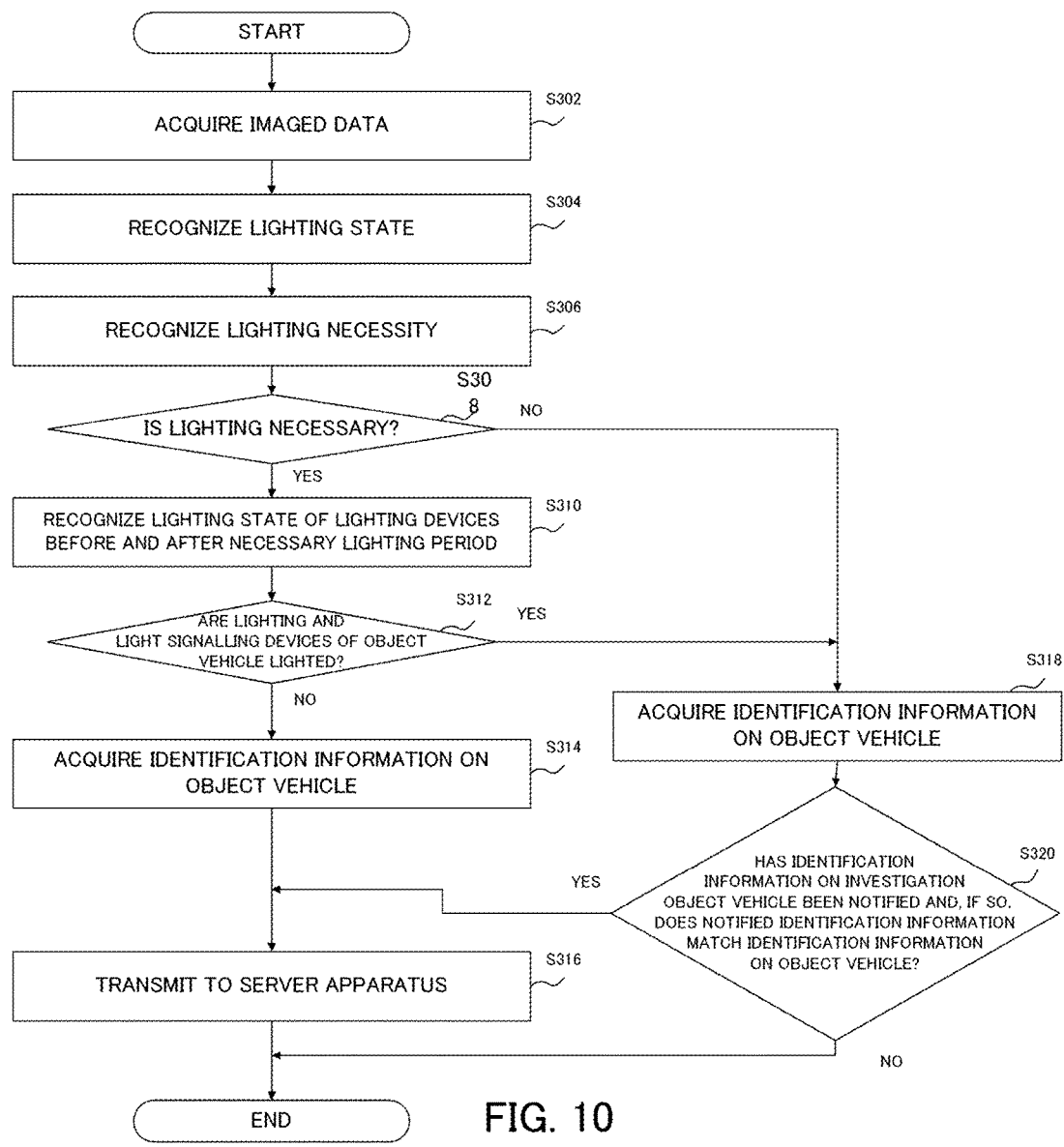
FIG. 10 is a flow chart showing processes of an abnormality detection apparatus according to the third embodiment.

FIG. 10 is a flow chart showing a flow of processes of the abnormality detection apparatus 101 according to the present embodiment. The abnormality detection apparatus 101 acquires imaged data (S302) and, based on the imaged data, performs recognition of a lighting state (S304) and recognition of a lighting necessity (S306). When it is determined that lighting is necessary (S308—YES), the abnormality detection apparatus 101 recognizes a lighting state in the necessary lighting period (S310). In addition, when the lighting devices of the object vehicle are not lighted during the period (S312—NO), the abnormality detection apparatus 101 acquires identification information on the object vehicle 84 (S314) and transmits abnormality detection information to the server apparatus 83 (S316). At this point, in the present embodiment, the abnormality detection apparatus 101 acquires identification information on the object vehicle 84 (S318) when it is determined that lighting is unnecessary (S308—NO) and when the lighting devices are lighted (S312—YES). In addition, when identification information on the investigation object vehicle is notified by the server apparatus 83 and, at the same time, the identification information matches identification information on the object vehicle 84 (S320—YES), detection information is transmitted to the server apparatus 83 regardless of the detection result. Moreover, in the present embodiment, the identification information is included in the investigation request.

Operation of Server Apparatus

Figure 11:
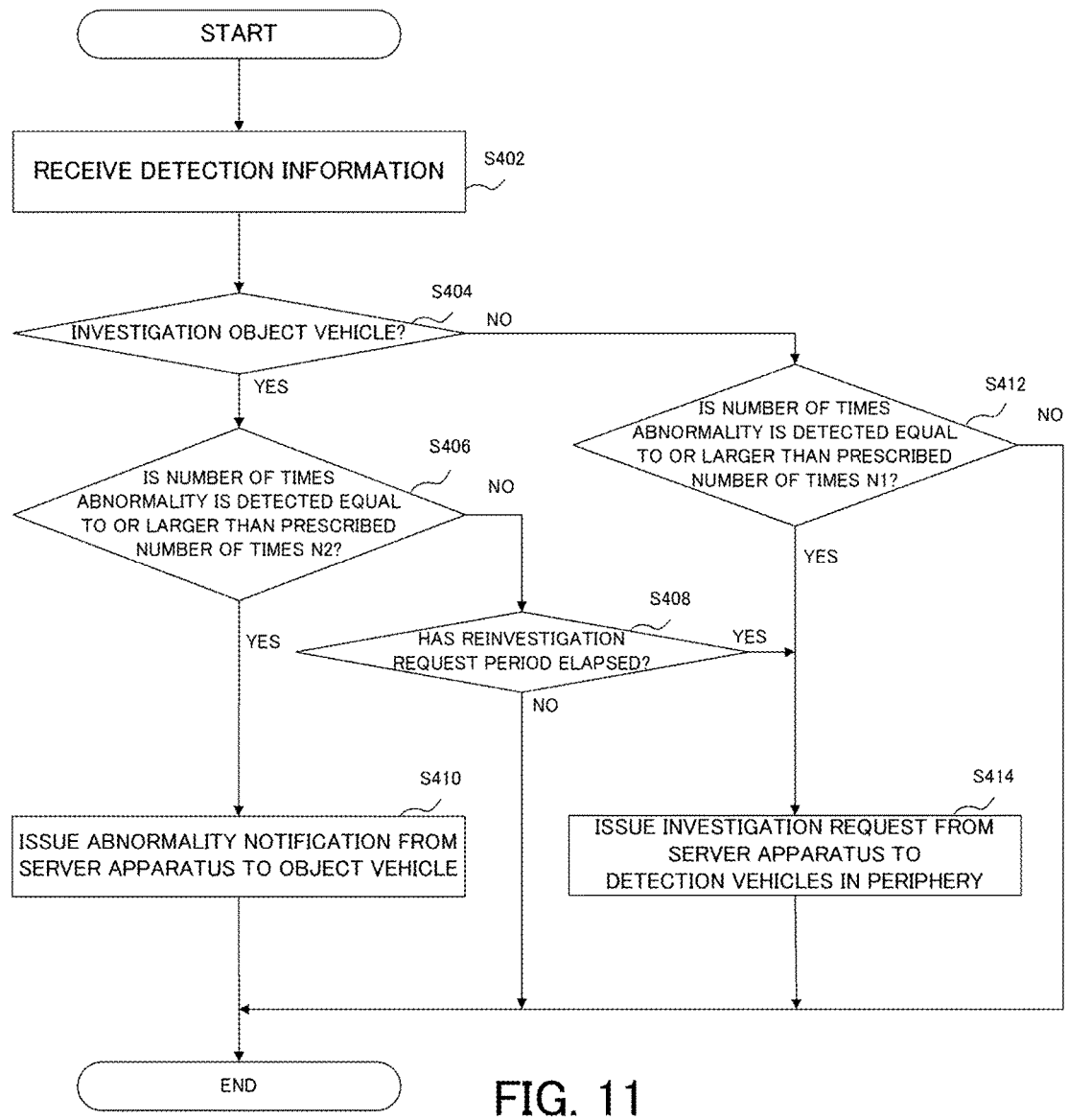
FIG. 11 is a flow chart showing processes of a server apparatus according to the third embodiment.

FIG. 11 is a flow chart showing a flow of processes of the server apparatus 83 according to the present embodiment. The reception unit 210 receives (S402) detection information transmitted from the abnormality detection apparatuses 101 (a detecting vehicle 81). When the received information is not information related to the investigation object vehicle (S404—NO) and, at the same time, abnormality detection information is consecutively received a prescribed number of times N1 or more within a prescribed period of time with respect to a specific vehicle (S412—YES), the server apparatus 83 recognizes the object vehicle 84 as an investigation object vehicle and issues an investigation request to the detecting vehicles 82 in the periphery of the object vehicle 84 (S414). In the present embodiment, the server apparatus 83 transmits the investigation request including identification information on the object vehicle 84. When the received information is information related to the investigation object vehicle (S404—YES) and, at the same time, abnormality detection information is consecutively received a prescribed number of times N2 or more within a prescribed period of time with respect to the investigation object vehicle (S406—YES), the server apparatus 83 issues an abnormality notification to the object vehicle 84 (the investigation object vehicle) (S410).

In step S406, when under the prescribed number of times N2 (S406—NO), a determination is made on whether or not a reinvestigation request period that is a period until an investigation request is issued once again after a previous investigation request had been issued has elapsed. When the reinvestigation request period has elapsed (S408—YES), the server apparatus 83 once again transmits an investigation request to the detecting vehicles 82 in the periphery (S414). Accordingly, even when the detecting vehicles 82 in the periphery of the object vehicle 84 have been replaced, the server apparatus 83 can transmit an investigation request to vehicles newly recognized as vehicles 82 in the periphery. In the present embodiment, when receiving detection information indicating a normal state, the server apparatus 83 may reset the number of times described above or exclude the detection information from investigation object vehicles.

While an example has been described in which a determination is made in accordance with a prescribed number of times abnormality detection information is consecutively received within a prescribed period of time with respect to a specific vehicle as determination conditions for issuing an abnormality notification in step S406 and issuing an investigation request in step S412 described above, determination conditions are not particularly limited. For example, when pieces of detection information indicating both normal and abnormal states are to be received within a prescribed period of time with respect to a specific vehicle, the server apparatus 83 may make a determination in accordance with a proportion of abnormality detection information. Moreover, while it is expected that the prescribed numbers of times N1 and N2 in steps S412 and S406 are to be set such that N2>N1, a magnitude relationship thereof is not particularly limited and N1 and N2 may have the same value.

According to the present embodiment, since the server apparatus 83 can receive information on an investigation object vehicle using detecting vehicles 82 in the periphery, there is an advantage that a determination and a notification regarding whether or not the object vehicle 84 operates abnormally can be performed in an expeditious manner as compared to the embodiments described above.

Although it is assumed that the server apparatus 83 retains positional information on a plurality of detecting vehicles 82, a method of acquiring positional information is not particularly limited. For example, the server apparatus 83 may acquire positional information on the plurality of detecting vehicles 82 via mobile phones or the like. In addition, examples of a detecting vehicle 82 in the periphery include a vehicle of which a distance to the object vehicle 84 is equal to or smaller than a prescribed distance and a vehicle present in a same area as the object vehicle 84. Furthermore, while an example has been described in which the server apparatus 83 issues an investigation request based on the number of times abnormality detection information is received, conditions of issuing an investigation request are not particularly limited. For example, an investigation request may be issued based on the lighting probability described earlier. Specifically, an investigation request may be issued when lighting devices of an object vehicle are not lighted in a situation where the lighting probability is low or intermediate. In addition, the server apparatus may issue an investigation request based on an instruction from a driver of a detecting vehicle. Moreover, the server apparatus 83 may notify vehicles other than those in the periphery of identification information on an investigation object vehicle.

Other Embodiments

While an example in which an abnormality detection apparatus mounted in the detecting vehicle 100 performs detection has been described in the embodiments presented above, the server apparatus 200 may be provided with the functions described above for performing abnormality detection. In other words, the server apparatus 200 may provide functions of the imaged data acquisition unit 110, the lighting state recognition unit 120, the storage unit 130, the lighting necessity recognition unit 140, the detection unit 150, the identification information acquisition unit 160, the transmission unit 170, and the like. In this case, the detecting vehicle 100 and the server apparatus 200 communicate wirelessly, and the detecting vehicle 100 transmits imaged data to the server apparatus 200. The server apparatus 200 acquires the imaged data and performs abnormality detection in a similar manner to that described above.

In addition, in the first to third embodiments described above, the detecting vehicle 100 may issue a notification directly to the object vehicle 300. In this case, the detecting vehicle 100 may issue a notification to the object vehicle 300 via vehicle-to-vehicle communication or may issue a notification by honking a horn mounted in the detecting vehicle 100. In addition, the detecting vehicle 100 may issue a notification by instantaneously lighting a driving beam (high beam). Furthermore, the detecting vehicle 100 may issue a notification to the object vehicle 300 by sound using a separately provided speaker or the like. According to such a configuration, an abnormality can be notified without using the server apparatus 200. Moreover, the abnormality detection apparatus 101 may change between transmitting an abnormality to the server apparatus 200 and notifying the object vehicle 300 of an abnormality depending on an importance of the abnormality. For example, the detecting vehicle 100 may perform a transmission to the server apparatus 200 when only a part of the lighting devices are not lighted and perform a transmission directly to the object vehicle 300 when all of the lighting devices are not lighted.

Moreover, the abnormality detection apparatus 101 need not include the transmission unit 170.

The configurations of the embodiments and the modifications described above can be used appropriately combined with each other without departing from the technical ideas of the present invention. In addition, the present invention may be realized by appropriately making changes thereto without departing from the technical ideas thereof.

What is claimed is:

1. A vehicle, comprising:
   an abnormality detection apparatus having:
   a camera that obtains imaged data by imaging another vehicle traveling on a road;
   a storage apparatus; and
   a computer programmed to:
   acquire the imaged data from the camera;
   recognize a lighting state of lighting devices of the other vehicle, based on the imaged data;
   store the lighting state in the storage apparatus;
   recognize a current lighting necessity of the lighting devices, based on the imaged data;
   retrospectively determine a period in which lighting is necessary, based on a behavior of the other vehicle obtained from the imaged data;
   detect whether the lighting devices operate normally or abnormally, based on the lighting state and the lighting necessity; and
   perform the detection, based on the period and the lighting state stored in the storage apparatus.

2. The vehicle according to claim 1, wherein
   the computer is programmed to recognize a relative movement of the other vehicle with respect to the vehicle from the imaged data and to recognize a behavior of the other vehicle by combining the relative movement of the other vehicle with a movement of the vehicle.

3. The vehicle according to claim 1, wherein
   the lighting devices are a blinker mounted in the other vehicle, and
   the computer is programmed to, when the other vehicle crosses a white line or turns left or right, determine the period, based on a timing at which the lighting devices should start operation and a timing at which the lighting devices should end operation.

4. The vehicle according to claim 1, wherein
   the lighting devices are a stop lamp mounted in the other vehicle, and
   the computer is programmed to, when the other vehicle stops or decelerates by a prescribed value or more, determine the period, based on a timing at which lighting of the lighting devices should be started and a timing at which lighting of the lighting devices should be ended.

5. The vehicle according to claim 1, wherein the computer is programmed to:
   acquire identification information on the other vehicle.

6. The vehicle according to claim 5, wherein the identification information is license number information on the other vehicle.

7. The vehicle according to claim 5, further comprising:
   a transmitter configured to transmit, when the computer detects an abnormality, detection information including a detection result and the identification information to a server apparatus.

8. The vehicle according to claim 1, further comprising:
   a notifier configured to transmit, when the computer detects an abnormality, an abnormality notification notifying the other vehicle of an abnormality that has occurred in lighting devices.

9. An abnormality detection system, comprising:
a plurality of vehicles according to claim 7; and
a server apparatus including a receiver configured to receive the detection information from the vehicles and a notifier configured to transmit an abnormality notification notifying one of the plurality of vehicles of an abnormality that has occurred in lighting devices.

10. The abnormality detection system according to claim 9, wherein
the server apparatus is programmed to notify the one of the plurality of vehicles of the abnormality notification when the detection information is received a prescribed number of times or more.

11. The abnormality detection system according to claim 9, wherein
the abnormality detection apparatus is configured to add traffic information to the detection information and transmit the detection information to the server apparatus; and
the server apparatus is configured to:
obtain a lighting probability that is a probability at which a lighting operation is to be performed in a situation obtained from the traffic information; and
notify the one of the plurality of vehicles of the abnormality notification when an abnormality of lighting devices of the one of the plurality of vehicles is consecutively detected for a number of times corresponding to the lighting probability.

12. The abnormality detection system according to claim 9, wherein
the notifier of the server apparatus is configured to, in response to receiving the detection information indicating that the lighting devices of the one of the plurality of vehicles operate abnormally, transmit an investigation request for requesting an investigation of the one of the plurality of vehicles to any of the plurality of vehicles in a periphery of the one of the plurality of vehicles, and
the vehicles in the periphery are configured to, when receiving the investigation request, transmit the detection information related to the one of the plurality of vehicles to the server apparatus, regardless of content of a detection result by the abnormality detection apparatus.

* * * * *